United States Patent [19]

Kasiraj et al.

[11] Patent Number: 5,127,087
[45] Date of Patent: Jun. 30, 1992

[54] METHOD OF ALLOWING THE TRANSMISSION OF ELECTRONIC MESSAGES BETWEEN ENROLLED AND UNENROLLED USERS OF COMPUTER SYSTEMS

[75] Inventors: Chander Kasiraj, Grapevine; Timothy J. Wolf, Bedford, both of Tex.

[73] Assignee: International Business Machines Corporation, Armonk, N.Y.

[21] Appl. No.: 300,668

[22] Filed: Dec. 27, 1988

[51] Int. Cl.⁵ .................. G06F 13/00; G06F 15/00
[52] U.S. Cl. ..................... 395/200; 364/226.1; 364/222.2; 364/242.94; 364/284.3; 364/919; 364/940.5; 364/DIG. 1
[58] Field of Search ... 364/200 MS File, 900 MS File; 379/92, 93, 94, 95, 96, 211, 212; 395/200

[56] References Cited

U.S. PATENT DOCUMENTS

| 4,640,991 | 2/1987 | Matthews et al. | 379/88 |
| 4,648,061 | 3/1987 | Foster | 364/900 |
| 4,713,780 | 12/1987 | Schultz et al. | 364/514 |
| 4,754,428 | 6/1988 | Schultz et al. | 364/900 |
| 4,932,026 | 6/1990 | Dev et al. | 370/94.1 |
| 4,987,587 | 1/1991 | Jolissaint | 379/94 |
| 5,018,194 | 5/1991 | Suzuki et al. | 379/207 |
| 5,027,384 | 6/1991 | Morganstein | 379/67 |
| 5,043,881 | 8/1991 | Hamazaki | 364/200 |

FOREIGN PATENT DOCUMENTS 57-29990  2/1983  Japan .................. 364/900

Primary Examiner—David Y. Eng
Assistant Examiner—Ayni Mohamed
Attorney, Agent, or Firm—Andrew J. Dillon

[57] ABSTRACT

A method allows for the communication of an electronic message between an enrolled user linked to a computer network and an unenrolled recipient. A recipient is designed for delivery of an electronic message from an enrolled user of a computer network. It is determined if the designated recipient is an enrolled user in the computer network. Then, in the event the designated recipient is not an enrolled user of the computer network, it is determined automatically whether the designated recipient has a designated intermediary linked to the computer network for receipt of the electronic message. The electronic message is directed from the enrolled user through the computer network to the unenrolled recipient in care of the designated intermediary.

16 Claims, 3 Drawing Sheets

METHOD OF ALLOWING THE TRANSMISSION OF ELECTRONIC MESSAGES BETWEEN ENROLLED AND UNENROLLED USERS OF COMPUTER SYSTEMS

BACKGROUND OF THE INVENTION

1. Technical Field

This invention relates generally to computer networks, and in particular to methods of transmitting electronic messages through computer networks.

2. Background Art

Electronic mail is rapidly supplanting post office mail as a means for communicating between individuals. One significant advantage of electronic mail is that the transmission time associated with electronic messages is ordinarily only seconds or fractions of a second, as compared to post office mail which ordinarily requires days.

The mailing time associated with post office mail often causes significant delay in the conduct of business, and has been largely ignored, and consequently tolerated, until the advent of express mail services and electronic mail. Nowadays, this widespread delay of business is identified as a "float;" minimizing or eliminating this float has become one goal of business managers, efficiency experts, and others hoping to increase societal productivity.

Electronic mail is one particularly attractive solution to mailing transaction delays; however, several drawbacks must be overcome to enhance the utility of electronic message transmission. One drawback is that electronic messages are ordinarily only transmittable between users enrolled, or "linked," to a common computer network, a requirement which severely limits the number of entities to which electronic messages may be transmitted. A second drawback is that the costs associated with enrolling and maintaining users in a computer network are far from insignificant, and include the costs of hardware, software, and network enrollment charges.

SUMMARY OF THE INVENTION

It is therefore one object of the present invention to allow the communication of electronic messages between an enrolled user linked to a computer network and an unenrolled user.

It is another object of the present invention to allow the communication of an electronic message between an enrolled user linked to a computer network and an unenrolled user, wherein the electronic message is transmitted through a designated intermediary who receives messages on behalf of the unenrolled recipient.

It is yet another object of the present invention to allow the communication of an electronic message between an enrolled user linked to a computer network and an unenrolled user, wherein the intermediary may consist of an individual, or a computer system.

The foregoing objects are achieved as is now described. A method is disclosed which allows for the communication of an electronic message between an enrolled user linked to a computer network and an unenrolled recipient. A recipient is designated for delivery of an electronic message from an enrolled user of a computer network. Next, it is determined whether or not the designated recipient is an enrolled user in the computer network. In the event the designated recipient is not an enrolled user of the computer network, the method of the present invention determine automatically whether the designated recipient has a designated intermediary linked to the computer network for receipt of the electronic message. The electronic message is then directed from the enrolled user through the computer network to the unenrolled recipient in care of the designated intermediary.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
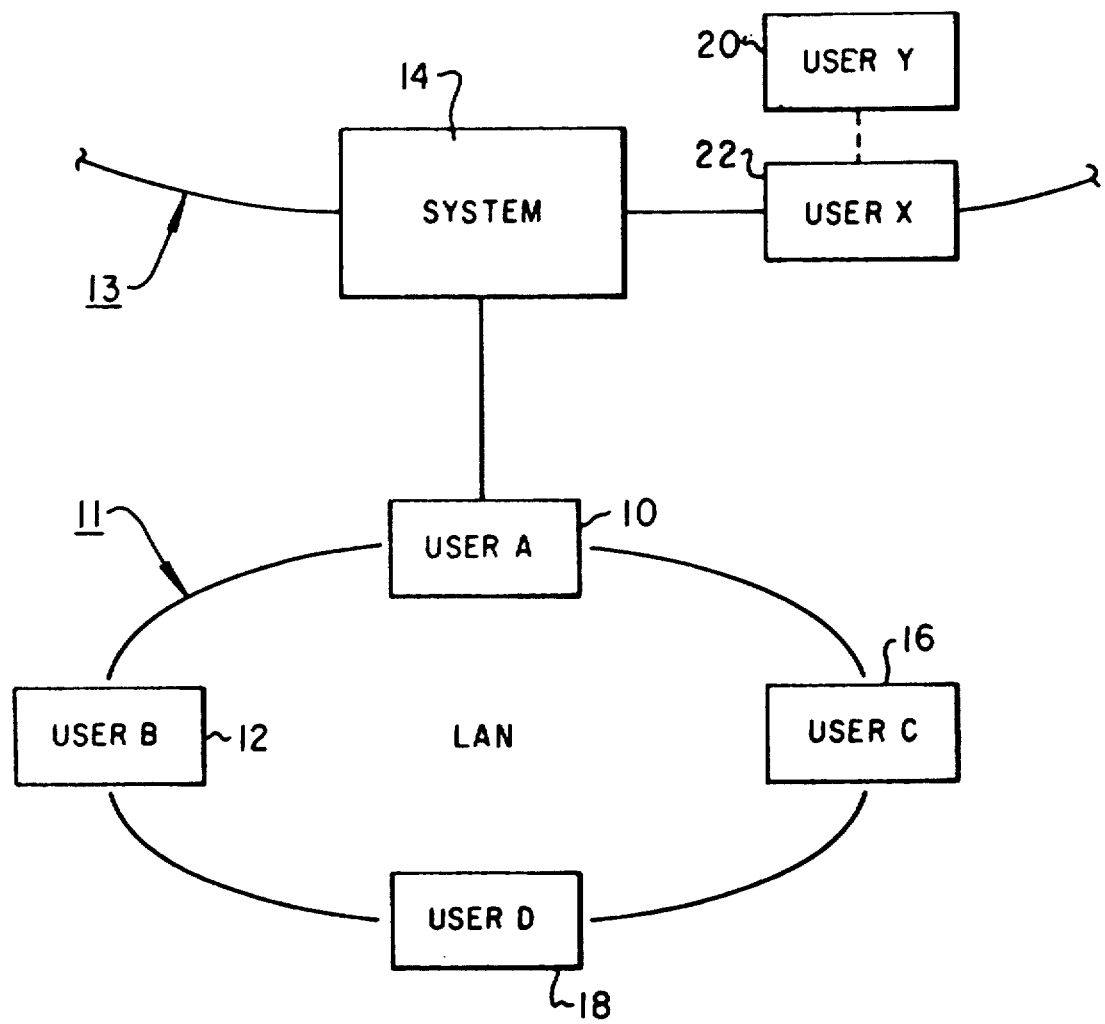
FIG. 1 depicts in block diagram form a Local Area Network (LAN) linked to a computer network through User A.

With reference now to the figures and in particular with reference to FIG. 1, Local Area Network (LAN) 11 is a self-contained computer network linking a plurality of users. As shown, Users A, B, C, and D are each linked in Local Area Network (LAN) 11 and are designated by boxes 10, 12, 16, and 18 respectively, and are capable of freely communicating electronic messages between one another within Local Area Network (LAN) 11. User A is also enrolled in a separate computer network 13, however, Users B, C, and D are not enrolled in computer network 13. User X (designated by box 22), as well as a plurality of additional users, (including user Y, designated by box 20), may be linked to computer network 13, and are capable of freely communicating electronic messages between one another. User A alone is capable of communicating freely with all users of Local Area Network (LAN) 11, as well as all users of computer network 13. Communication of messages between User X of computer network 13 and any user of Local Area Network (LAN) 11 other than User A, is difficult to achieve without significant time delays.

The method of the present invention allows the communication of electronic messages between enrolled users linked to a particular computer network, and unenrolled users not linked to that particular computer network. The present method allows an unenrolled user to both receive and send electronic messages through a designated intermediary linked to the particular computer network. The present method may be characterized by a plurality of method steps, some of which may be characterized for purposes of exposition as occurring at an "origination system," and some of which may be characterized for purposes of exposition as occurring at a "destination system."

Figure 2:
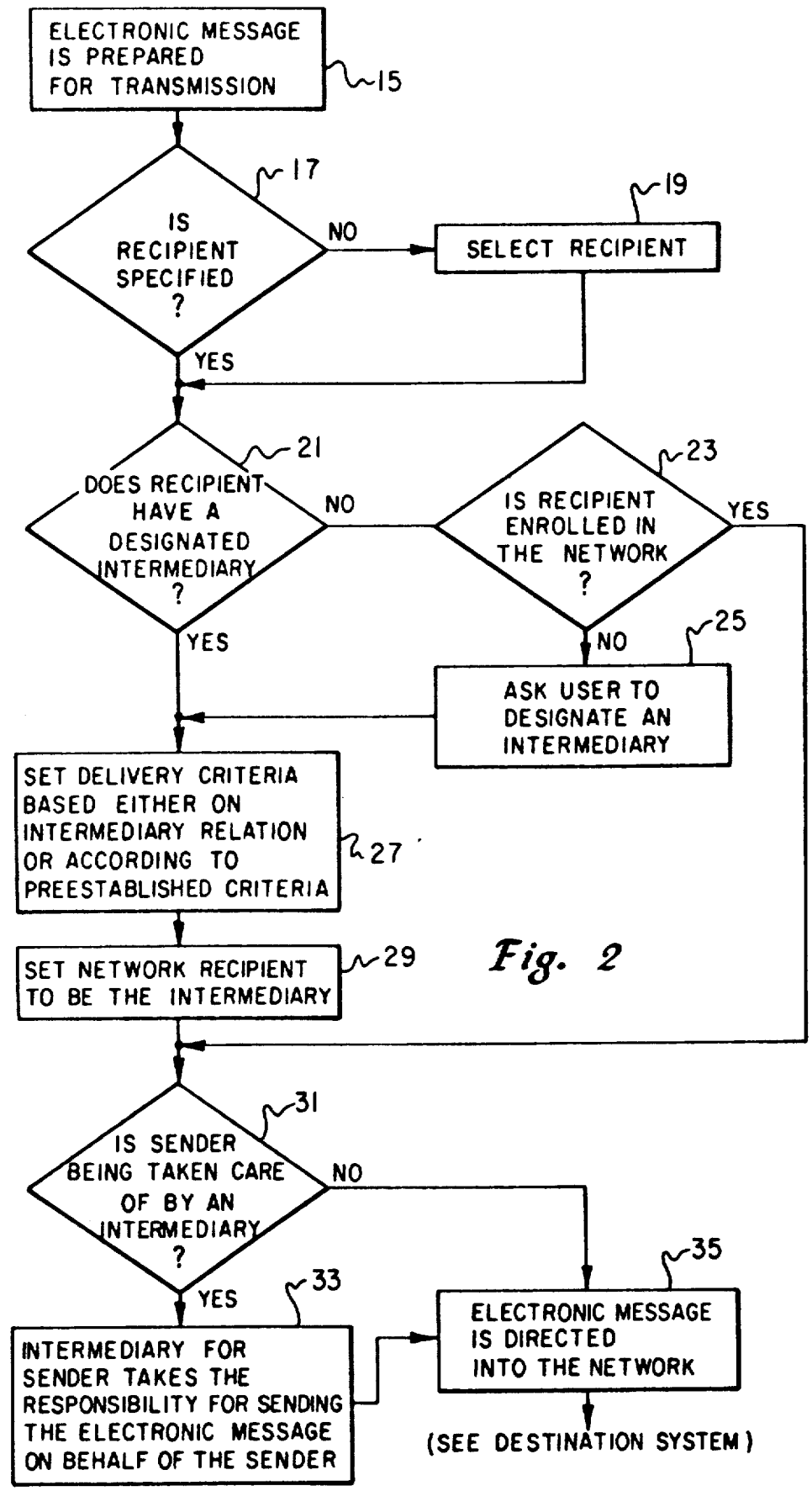
FIG. 2 depicts a logic flow chart illustrating the method steps of the present invention at the origination system.
Figure 3:
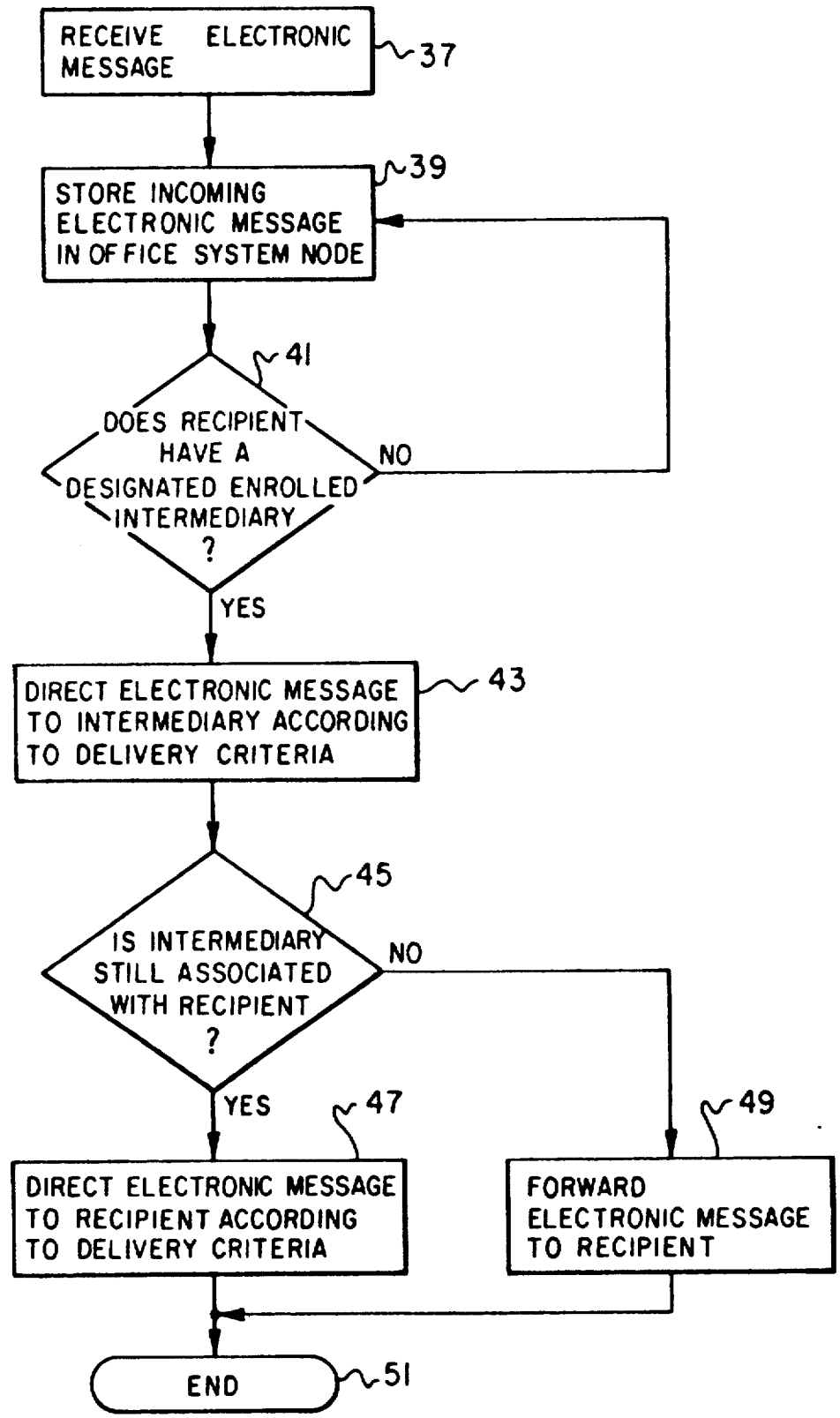
FIG. 3 depicts a logic flow chart illustrating the method steps of the present invention at the destination system.

The origination system method steps of one preferred embodiment of the present invention are depicted in flow chart form in FIG. 2, while the destination system method steps of the same preferred embodiment are depicted in flow chart from in FIG. 3; FIGS. 2 and 3 should be read together to fully understand one preferred embodiment of the method of transmitting electronic messages in accordance with the present invention. References in this description to FIG. 1 are provided as examples only, since the present invention is not limited to communication between a computer network and a Local Area Network (LAN); rather, electronic messages which may be transmitted between two distinct computer networks, or between two distinct Local Area Networks. Additionally, each user depicted in FIG. 1 may consist of either an individual, or a computer system, such as a personal computer.

Referring now to FIG. 2, the method steps of the origination system will now be described, with occasional reference to FIG. 1 for purposes of exposition.

As depicted in block 15, an electronic message is prepared by an enrolled or unenrolled user, for transmission to an enrolled or unenrolled recipient. As in other forms of communication, it is important that the recipient of the message be specified; therefore, as illustrated in block 17, it is determined whether the recipient is specified on the face of the electronic message. If not, the sender is prompted to select a recipient, as depicted in block 19.

If the recipient is either specified (as determined in block 17) or selected (as done in block 19), the block 21, is utilized to determine whether the recipient has a designated intermediary. If so, delivery criteria for the electronic message is set as depicted in block 27. Such delivery criteria may be based either on the relationship between recipient and intermediary, or according to a pre-established criteria set either by recipient or sender. If, however, in the step illustrated in block 21, it is determined that the recipient does not have a designated intermediary, then as depicted in block 23, it is determined whether or not the recipient is enrolled in the network. If the recipient is indeed enrolled in the network, there is no need to utilize an intermediary, and the electronic message may be sent directly to the recipient through the computer network. Thereafter, the method advances to block 31. However, if the recipient is not enrolled in the network, transmission of the electronic message may be difficult or impossible to accomplish. Therefore, as illustrated in block 25, the sender is prompted to designate an intermediary for receipt of the electronic message on behalf of the unenrolled recipient, and the method continues as depicted in block 27, as described above.

Once a designated intermediary has been identified or designated, as illustrated in block 29, the designated intermediary is established as the network recipient for receiving the electronic message on behalf of the unenrolled recipient.

Next, as illustrated in block 31, it is determined whether or not the sender is represented by his or her own intermediary, for transmitting electronic messages on behalf of the sender. If not, the electronic message is directed into the computer network as depicted in block 35. However, if the sender is indeed being represented by his or her own intermediary, then block 33 illustrates, the sender's intermediary taking the responsibility of sending the electronic message on behalf of the sender, and does so as depicted in block 35.

With reference again to FIG. 1, the origination system described above will now be exemplified. Assume, for example, that User Y desires to send an electronic message to User D. Since both User Y and User D are unenrolled in computer network 13 it is impossible to transmit an electronic message by conventional means. However, communication may be accomplished according to the present invention if User X is designated as an intermediary for sending electronic messages on behalf of User Y and User A serves as an intermediary for receiving and sending electronic messages on behalf of User D.

In accordance with the method of the present invention, user Y then prepares the electronic message for transmission as illustrated in block 15, specifying User D as the recipient as depicted in block 17. Next, as illustrated in block 21, system 14 determines whether or not User D has a designated intermediary for receipt of messages on behalf of User D, as illustrated in block 21. Since User A is designated as an intermediary for User D, the delivery criteria is set based upon either the intermediary relationship between User A and User D, or according to a pre-established criteria set between User A and User D, as depicted in block 27. As illustrated in block 29, User A is automatically set as the network recipient for an electronic message from User Y.

Next, as depicted in block 31, system 14 determines whether User Y is being represented by an intermediary. Since User X is the intermediary for User Y, User X takes responsibility for sending the electronic message on behalf of User Y, as illustrated in block 33, and sends the message into the network as depicted in block 35.

Referring now to FIG. 3, the method steps at the destination system in accordance with one preferred embodiment of the present invention will now be described. As illustrated in block 37, the electronic message is received, and stored in an office system node as depicted in block 39, if such node exists. Then, as illustrated in block 41, it is determined whether or not the recipient has a designated enrolled intermediary to verify that the correct intermediary has been set as depicted in block 29 of FIG. 2. This prevents the transmission of an electronic message to an incorrect intermediary. If, the recipient does have a designated intermediary enrolled in the particular computer network, as illustrated in block 43, the electronic message is directed to that intermediary according to the delivery criteria. As depicted in block 45, it is determined whether the intermediary is still associated with the recipient. If the intermediary is still associated with the recipient, as illustrated in block 47, the electronic message is delivered by the intermediary to the recipient according to the delivery criteria. If not, the electronic message is forwarded to the recipient according to as depicted in block 49. The method ends when the electronic message is received by recipient as illustrated in block 51.

Referring now to FIG. 1, the method steps of the destination system will now be described. The electronic message sent by User Y is received by User A and stored in User A's office system node according to steps 37 and 39. In some computer systems, the office system node is accessible by a plurality of users, but in the example of FIG. 1, User A is the only user in the Local Area Network (LAN) 11 that is linked to computer network 13, and therefore maintains sole access to the office system node.

As depicted in block 41, it is determined again whether User D has an enrolled intermediary, to verify that User A is indeed the appropriate designated intermediary. If so, the electronic message is delivered to User A according to delivery criteria. The delivery criteria may specify the actions which User A may perform. For example, the criteria may demand that User A only deliver the message, without reading it. As illustrated in block 45, it is determined whether designated intermediary User A is still associated with recipient User D. If not, the electronic message is forwarded to the recipient, by other means. If so, the electronic message is directed through the Local Area Network (LAN) to User D according to the delivery criteria, and the message is received by User D as depicted in block 51.

In the present invention, User D may respond to User Y by electronic message. In that case, the Local Area Network (LAN) 11 comprises the destination system, and the method steps depicted in FIG. 2 are followed by User D in preparing and sending the message through User A. The electronic message is then received by User X, who acts as a designated intermediary on behalf of User Y for the receipt of electronic messages.

As shown in FIG. 1, User A may serve as a designated intermediary for one or more of the entities enrolled in the Local Area Network (LAN) 11. For example, User A may serve as designated intermediary for any combination of Users B, C, and D. User A may be a computer which is simultaneously linked to computer network 13, and Local Area Network 11, serving as an entirely automated designated intermediary. Under this approach, User A becomes a gateway agent between the computer networks. In any event, whether User A is a living individual, or a computer network, it may serve as a designated intermediary for a plurality of users.

Additionally, it is possible for an unenrolled user to have a plurality of designated intermediaries, each designated to receive particular electronic messages on behalf of the unenrolled recipient according to separate predetermined delivery criteria. For example, an unenrolled user may employ one designated intermediary to receive all electronic messages pertaining to business matters, and another designated intermediary to receive all electronic messages pertaining to personal matters.

Those skilled in the art will appreciate that it is possible under the present system to allow either the unenrolled recipient or the sender to designate an intermediary for the unenrolled recipient. It is also possible for either the unenrolled user or the sender to establish the delivery criteria which controls the transmission of the electronic message.

Under certain circumstances, an unenrolled user may not wish the sender of an electronic message to know that he or she is employing a designated intermediary for receipt of electronic messages. Therefore, it is desirable to allow the unenrolled user to determine whether the use of a designated intermediary will be revealed to the sender of the electronic message. The concealment of the designated intermediary may be offered as an option to the unenrolled user when the delivery criteria is set by the unenrolled user.

The method of the present invention has a number of distinct advantages over existing electronic communication systems. For example, the method of the present invention allows for broadened use of electronic messages, and accordingly reduces the "float" time associated with post office communications. Further, this method avoids the significant cost associated with enrolling each and every employee in a computer network, by allowing one or more designated employees to serve as intermediaries for their co-workers.

While the invention has been particularly shown and described with reference to a preferred embodiment, it will be understood by those skilled in the art that various changes in form and detail may be made therein without departing from the spirit and scope of the invention.

We claim:

1. A method of communicating an electronic message between an enrolled user linked to a computer network and a recipient, comprising the steps of:

designating a recipient for delivery of an electronic message from an enrolled user of a computer network;

determining if said designated recipient is an enrolled user linked to said computer network;

determining automatically, when said designated recipient is not enrolled and is not linked to said computer network, whether said designated recipient has a designated intermediary linked to said computer network for receipt of said electronic message;

directing said electronic message through said computer network in care of said designated intermediary when the unenrolled and not linked designated recipient has a designated intermediary linked to said computer network.

2. A method of communicating an electronic message between an enrolled user linked to a computer network and a recipient according to claim 1 wherein said intermediary comprises a computer simultaneously linked to said computer network and to a separate and distinct computer network, wherein said separate and distinct computer network comprises a stand-alone, multi-user system, wherein said intermediary serves as a gateway agent between said computer networks.

3. A method of communicating an electronic message between an enrolled user linked to a computer network and a recipient according to claim 1 wherein said electronic message is directed from said enrolled user through said computer network to said recipient in care of said intermediary while simultaneously revealing to said enrolled user that said electronic message is being routed to said intermediary.

4. A method of communicating an electronic message between an enrolled user linked to a computer network and a recipient according to claim 1 wherein said electronic message is directed from said enrolled user through said computer network to said recipient in care of said intermediary without revealing to said enrolled user that said electronic message is being routed to said intermediary.

5. A method of communicating an electronic message between an enrolled user linked to a computer network and a recipient according to claim 1 wherein said intermediary serves as an intermediary for a plurality of recipients.

6. A method of communicating an electronic message between an enrolled user linked to a computer network and a recipient according to claim 1 wherein said intermediary comprises one of a plurality of designated intermediaries, each designated to receive particular electronic messages on behalf of said recipient according to a predetermined delivery criteria.

7. A method of communicating an electron message between an enrolled user linked to a computer network and a recipient, comprising the steps of:

selecting said recipient for delivery of said electronic message to be sent through said computer network;

determining automatically whether said selected recipient is an enrolled user linked to said computer network;

determining automatically whether said selected recipient has a designated intermediary linked to said computer network for receipt of said electronic message, in the event said selected recipient is not an enrolled user and is not linked to said computer network;

designating an intermediary linked to a computer network for receipt of an electronic message on behalf of said selected recipient in the event no designated intermediary exists; and directing said electronic message from said enrolled user through said computer network to said intermediary on behalf of said selected recipient.

8. A method of communicating an electronic message between an enrolled user linked to a computer network and a recipient according to claim 7 wherein said intermediary comprises a computer simultaneously linked to said computer network and to a separate and distinct computer network, wherein said separate and distinct computer network comprises a stand-alone, multi-user system, whereby said intermediary serves as a gateway agent between said computer networks.

9. A method of communicating an electronic message between an enrolled user linked to a computer network and a recipient according to claim 7 wherein said intermediary comprises one of a plurality of designated intermediaries, each designated to receive particular electronic messages on behalf of said recipient according to a predetermined delivery criteria.

10. A method of communicating an electronic message between an enrolled user linked to a computer network and a recipient according to claim 7 wherein said intermediary receives said electronic message from said enrolled user and delivers said electronic message to said recipient according to a predetermined delivery criteria established by said enrolled user.

11. A method of communicating an electronic message between an enrolled user linked to a computer network and a recipient according to claim 7 wherein said intermediary receives said electronic message from said enrolled user and delivers said electronic message to said recipient according to a predetermined delivery criteria established by said recipient.

12. A method of communicating an electronic message between an enrolled user linked to a computer network and a recipient according to claim 7 wherein said intermediary serves as an intermediary for a plurality of recipients.

13. A method of communicating an electronic message between an enrolled user linked to a computer network and a recipient according to claim 7 wherein said electronic message is directed from said enrolled user through said particular computer network to said recipient in care of said intermediary without revealing to said enrolled user that said electronic message is being routed to said intermediary.

14. A method of communicating an electronic message between an enrolled user linked to a computer network and a recipient according to claim 7 wherein said electronic message is directed from said enrolled user through said computer network to said recipient in care of said intermediary while simultaneously revealing to said enrolled user that said electronic message is being routed to said intermediary.

15. A data processing system for communicating an electronic message between an enrolled user linked to a computer network and a recipient, said data processing system comprising:

means for designating a recipient for delivery of an electronic message from an enrolled user of a computer network;

means for determining if said designated recipient is an enrolled user linked to said computer network;

means for determining automatically, when said designated recipient is not enrolled and is not linked to said computer network, whether said designated recipient has a designated intermediary linked to said computer network for receipt of said electronic message;

means for directing said electronic message through said computer network in care of said designated intermediary when the unenrolled and not linked designated recipient has a designated intermediary linked to said computer network.

16. The data processing system for communicating an electronic message between an enrolled user linked to a computer network and a recipient according to claim 15, wherein said intermediary comprises a computer simultaneously linked to said computer network and to a separate and distinct computer network, wherein said separate and distinct computer network comprises a stand-alone, multi-user system, wherein said intermediary serves as a gateway agent between said computer networks.

* * * * *